(12) United States Patent
Endo

(10) Patent No.: US 6,671,104 B2
(45) Date of Patent: Dec. 30, 2003

(54) ZOOM LENS AND OPTICAL INSTRUMENT USING THE SAME

(75) Inventor: Hiroshi Endo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/016,115

(22) Filed: Dec. 17, 2001

(65) Prior Publication Data

US 2002/0196560 A1 Dec. 26, 2002

(30) Foreign Application Priority Data

Dec. 22, 2000 (JP) ........................................ 2000-390431

(51) Int. Cl.[7] .............................................. G02B 15/14
(52) U.S. Cl. ........................................ 359/691; 359/689
(58) Field of Search ................................ 359/683, 686, 359/689, 691

(56) References Cited

U.S. PATENT DOCUMENTS

| | | | | |
|---|---|---|---|---|
| 5,044,706 A | | 9/1991 | Chen ........................... 359/357 |
| 5,268,790 A | | 12/1993 | Chen ........................... 359/558 |
| 5,452,134 A | | 9/1995 | Sato ............................ 359/682 |
| 5,585,969 A | | 12/1996 | Endo ........................... 359/683 |
| 5,790,321 A | | 8/1998 | Goto ........................... 359/742 |
| 5,872,658 A | | 2/1999 | Ori .............................. 359/677 |
| 5,875,059 A | * | 2/1999 | Estelle ......................... 359/682 |
| 6,067,196 A | | 5/2000 | Yamamoto et al. .......... 359/565 |
| 6,078,434 A | | 6/2000 | Ori .............................. 359/691 |
| 6,081,389 A | | 6/2000 | Takayama et al. ........... 359/680 |
| 6,094,314 A | | 7/2000 | Tanaka ........................ 359/689 |
| 6,101,044 A | | 8/2000 | Ori et al. ..................... 359/691 |
| 6,147,811 A | * | 11/2000 | Fujibayashi .................. 359/689 |
| 6,172,818 B1 | | 1/2001 | Sakamoto .................... 359/689 |
| 6,219,190 B1 | * | 4/2001 | Itoh ............................. 359/692 |
| 6,275,342 B1 | * | 8/2001 | Sakamoto et al. ........... 359/691 |
| 6,452,729 B2 | * | 9/2002 | Yamamoto ................... 359/676 |
| 6,496,310 B2 | * | 12/2002 | Fujimoto ..................... 359/680 |

FOREIGN PATENT DOCUMENTS

| EP | 913718 | 5/1999 | |
|---|---|---|---|
| EP | 913718 A2 * | 5/1999 | ......... G02B/15/177 |
| JP | 4-213421 | 8/1992 | |
| JP | 5-88084 | 4/1993 | |
| JP | 6-324262 | 11/1994 | |
| JP | 7-234360 | 9/1995 | |
| JP | 9-197274 | 7/1997 | |
| JP | 9-211329 | 8/1997 | |

* cited by examiner

Primary Examiner—Georgia Epps
Assistant Examiner—Darryl J. Collins
(74) Attorney, Agent, or Firm—Fitzpatrick, Cella, Harper & Scinto

(57) ABSTRACT

A negative-lead type zoom lens has a diffractive optical element and is led by a lens unit having a negative optical power. In this zoom lens, various kinds of aberration including chromatic aberration are excellently corrected by properly setting the lens configuration of each lens unit so as to achieve high optical performance over the entire range of a variable power while the entire lens system is miniaturized and designed to have a wide angle. The zoom lens according to the present invention is suitable for a zoom lens with a wide angle including a wide-angle region that is a focal length of substantially 28 mm on a 35 mm single lens reflex camera basis.

31 Claims, 13 Drawing Sheets

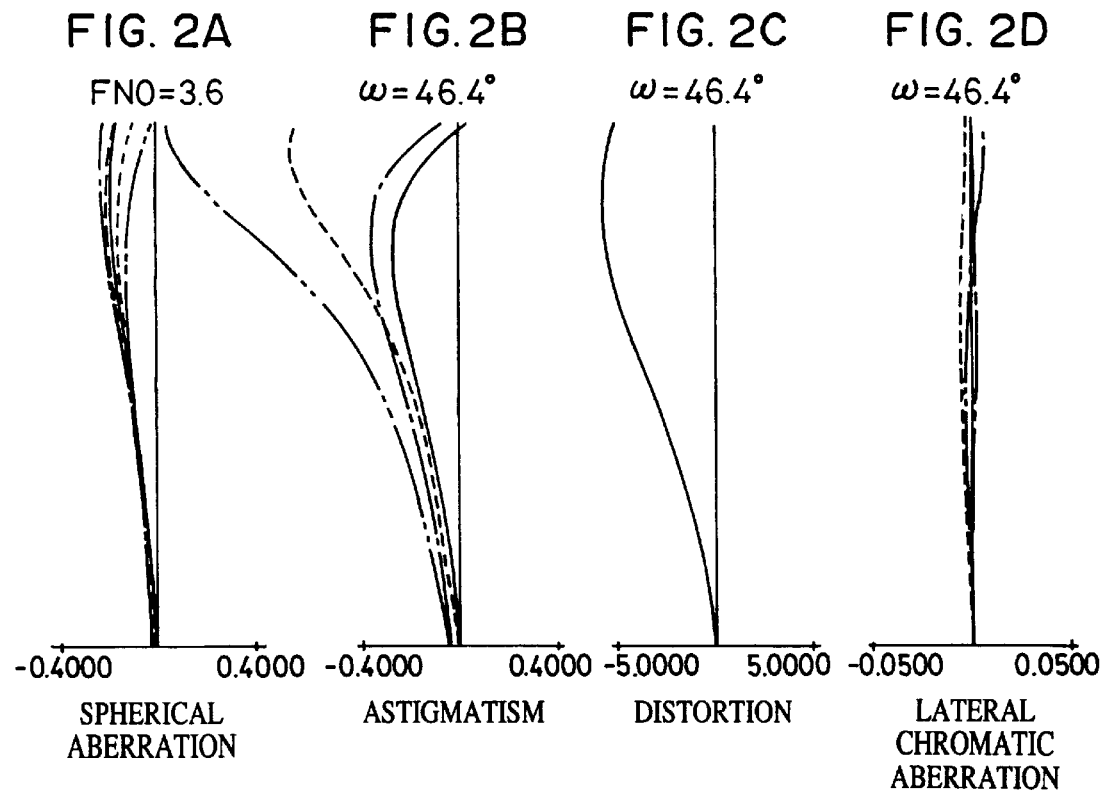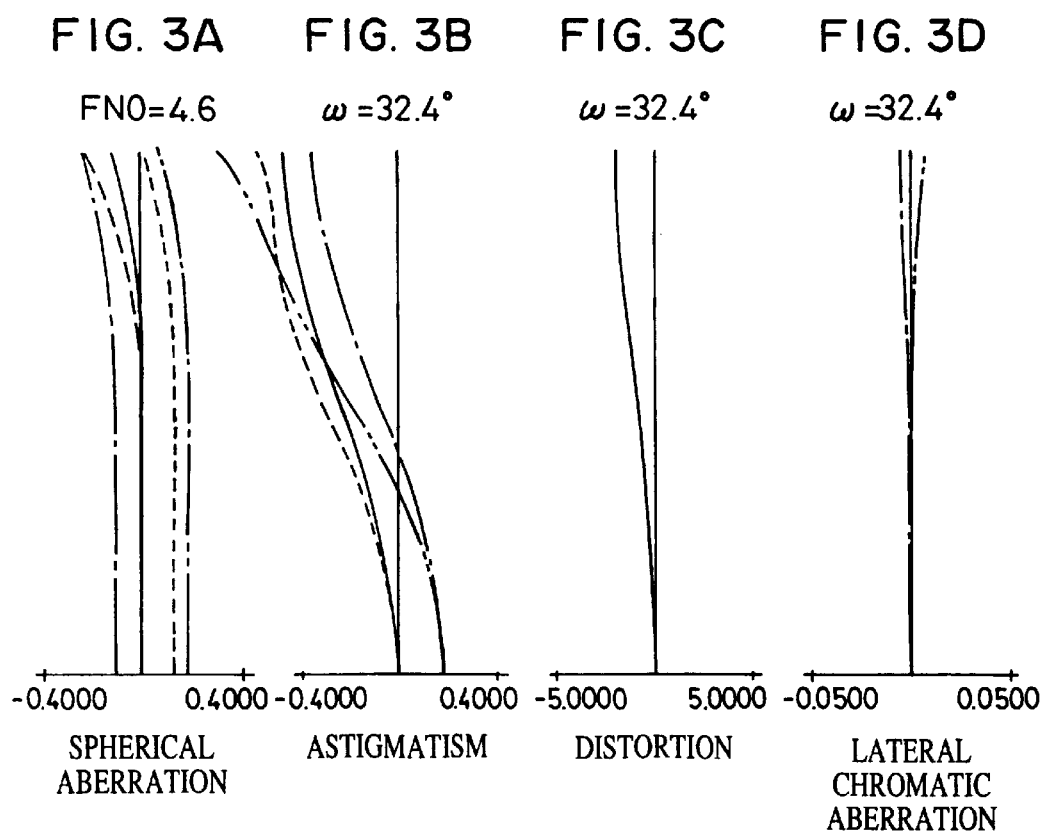

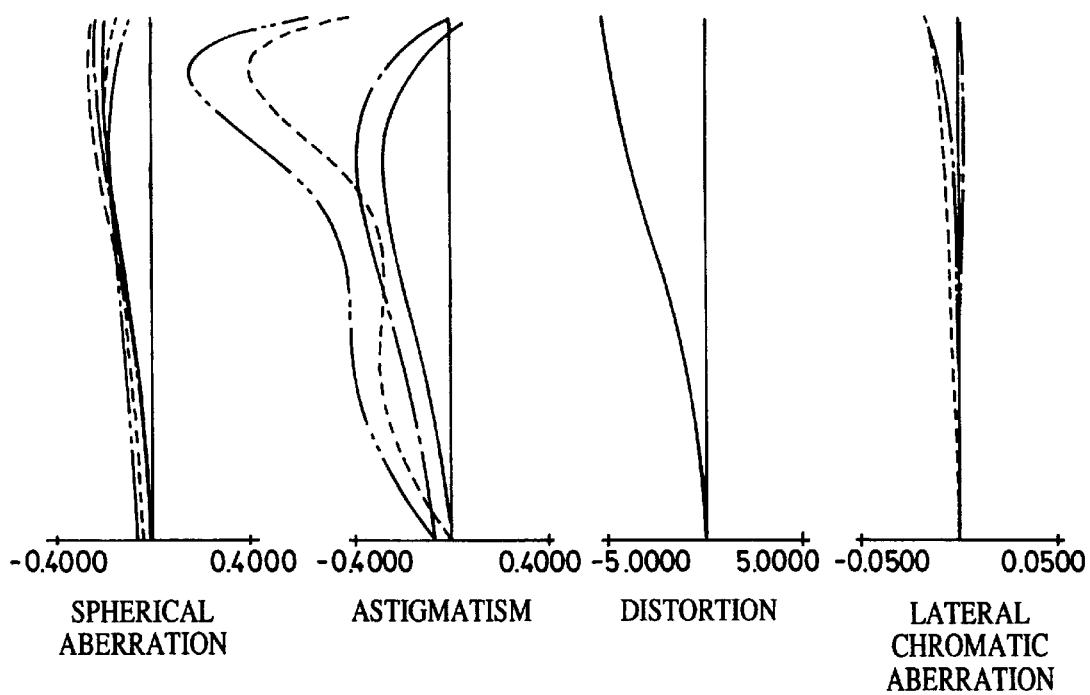
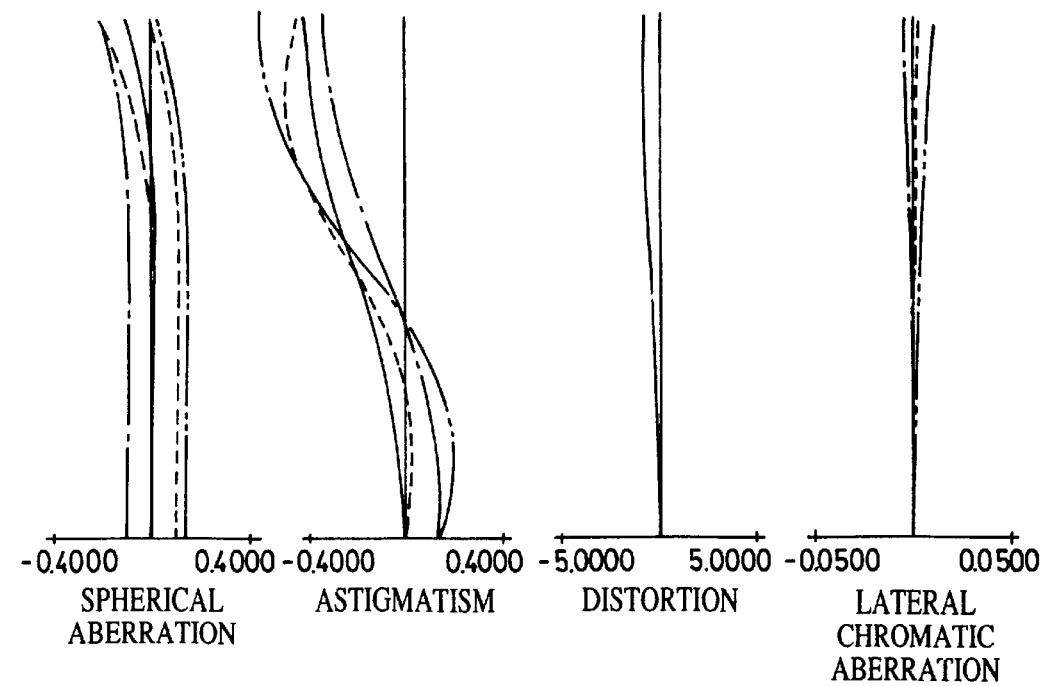

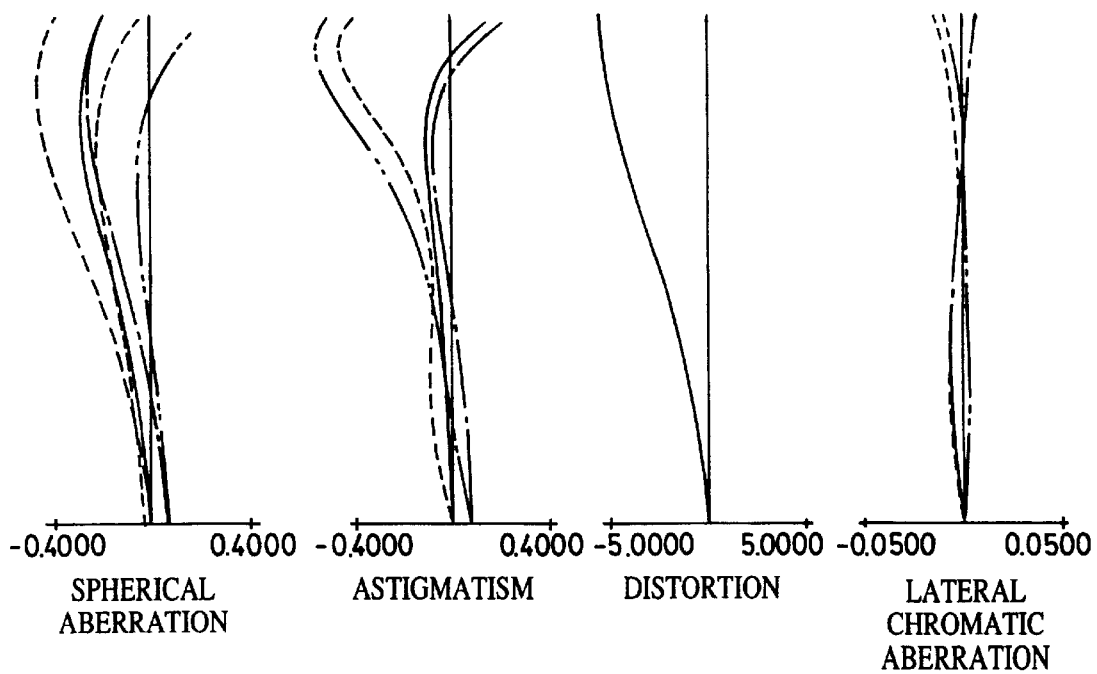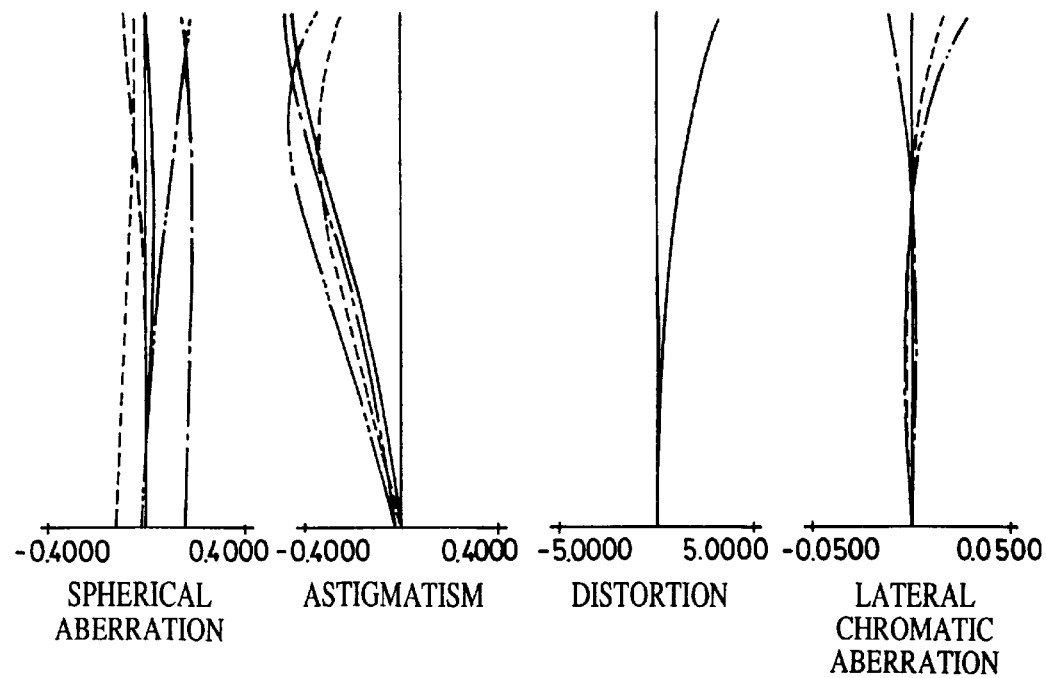

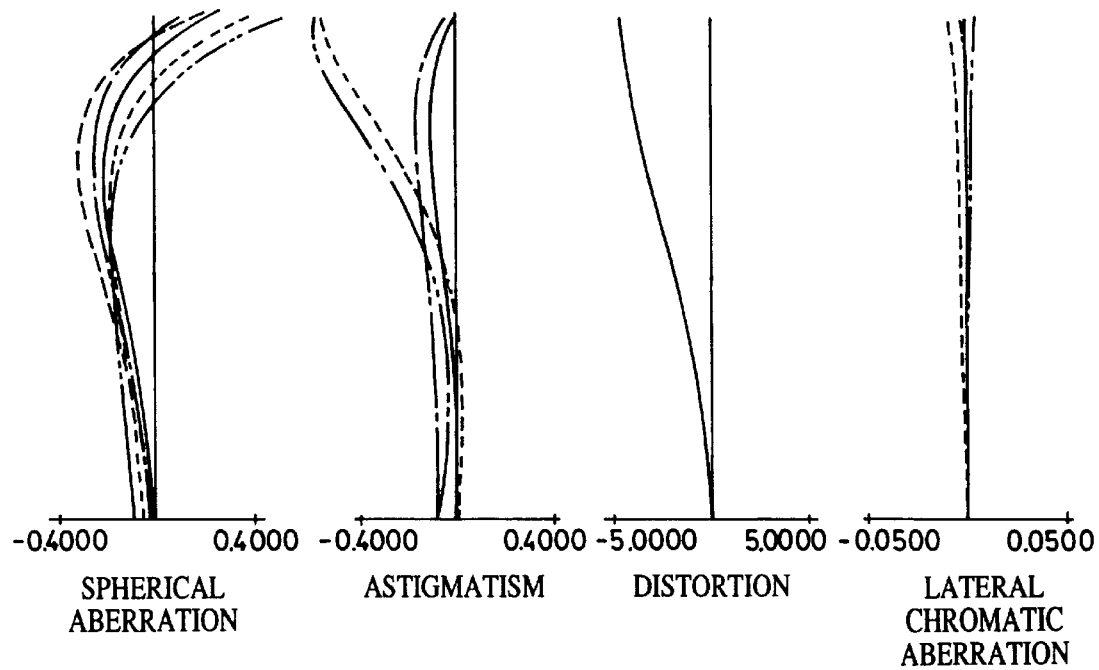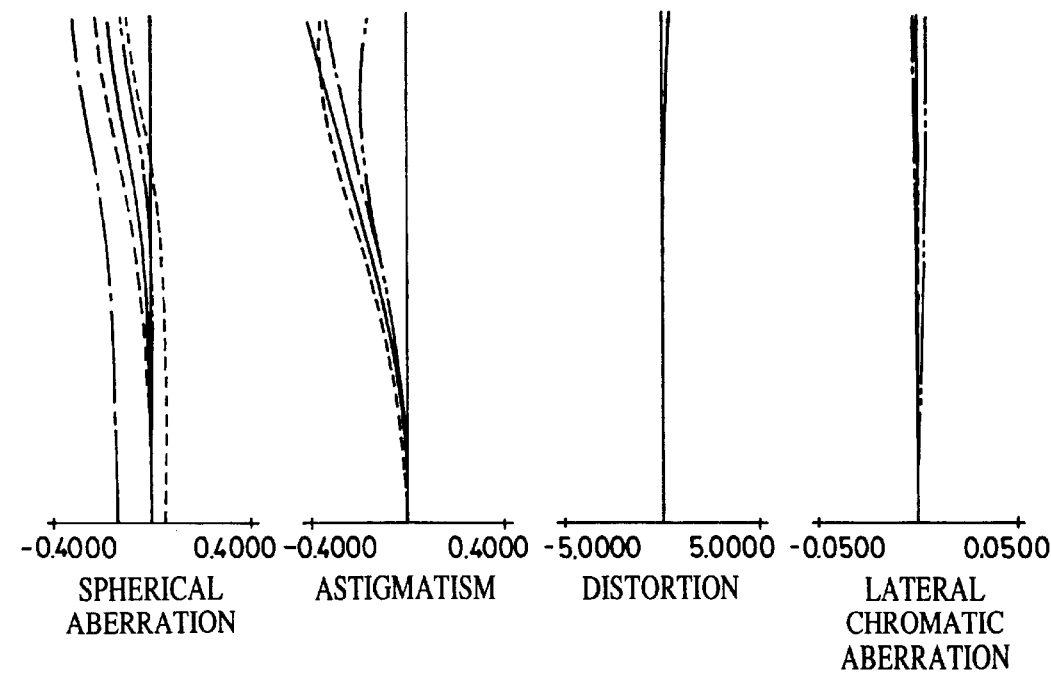

ZOOM LENS AND OPTICAL INSTRUMENT USING THE SAME

BACKGROUND OF THE INVENTION

1. Field of the Invention

The present invention relates to a zoom lens and an optical instrument using the zoom lens, and in particular relates to a wide-angle zoom lens and an optical instrument using the wide-angle zoom lens suitable for still cameras, such as single lens reflex cameras, electronic still cameras, and video cameras, which are compact and high-efficiency especially preferably correcting lateral chromatic aberration.

2. Description of the Related Art

An interchangeable lens for a single lens reflex camera requires a long back focus in some degree in order to ensure a space for arranging a quick-return mirror and so forth in the image plane side of a lens system. In a digital camera using a photoelectric conversion element such as a CCD, a long back focus is also required in order to ensure a space for arranging a low-pass filter, an infrared cutting filter, and so forth.

Hitherto, as a wide-angle zoom lens with a focal length at a wide-angle end of less than 35 mm on a zoom lens basis for a 35 mm single lens reflex camera, a so-called negative-lead type short zoom lens having a negative lens group and a positive lens group led by a negative refractive power is disclosed in Japanese Patent Laid-Open No. 5-88084 (corresponding to U.S. Pat. No. 5,452,134) and Japanese Patent Laid-Open No. 7-234360, for example.

This is a retrofocus type lens system which is a zoom type system capable of ensuring a long back focus with the most simple lens structure. This zoom type is advantageous for cost cutting due to the simple structure.

Hitherto, in the wide-angle zoom lens described above, excellent correction of image plane curvature and lateral chromatic aberration has been a particular challenge for obtaining good optical performance. The problem occurs due to the asymmetric arrangement of refractive powers in which the object side of a lens system has a negative refractive power and the image side has a positive refractive power across a diaphragm therebetween, and especially with regard to lateral chromatic aberration, a large amount of aberration remains in a range from the central part of the image toward the peripheral part, and a color halo may be thereby produced especially when taking a picture of an object with high-contrast brightness. One method for correcting the lateral chromatic aberration involves the use of anomalous dispersion glass; however, it may have a tendency to increase the number of lenses in the lens system.

As for chromatic aberration, other than a correction method in which glass materials having different dispersion are combined together, there are corrected optical systems in which a lens surface or a part of the optical system is provided with a diffractive optical element having a diffraction function, which are disclosed in Japanese Patent Laid-Open No. 4-213421 (corresponding to U.S. Pat. No. 5,044,706), Japanese Patent Laid-Open No. 6-324262 (corresponding to U.S. Pat. No. 5,790,321), Japanese Patent Laid-Open No. 9-197274 (corresponding to U.S. Pat. No. 6,067,196), Japanese Patent Laid-Open No. 9-211329 (corresponding to U.S. Pat. No. 5,872,658), and U.S. Pat. No. 5,268,790, for example.

In general, in a negative lead type zoom lens comprising two lens groups of a first group having a negative refractive power and a second group having a positive refractive power, widening the picture angle is comparatively easy and a predetermined back focus is readily obtained.

However, in order to obtain excellent optical performance over the entire optical power range while widening the picture angle, it is necessary to properly set the arrangement of the refractive power and the lens configuration of each lens group. When the arrangement of the refractive power and the lens configuration of each lens group are improper, changes in chromatic aberration accompanied by a variable power become larger even when using a diffractive optical element, so that excellent optical performance over the entire optical power range is difficult to be obtained.

SUMMARY OF THE INVENTION

It is an object of the present invention to provide a zoom lens that is a negative-lead type zoom lens led by a lens unit having a negative optical power, in which various kinds of aberration including chromatic aberration are excellently corrected by properly setting the lens configuration of each lens unit so as to achieve high optical performance over the entire range of a variable power while the entire lens system is miniaturized and designed to have a wide angle.

In particular, the invention is directed to a compact zoom lens with a wide angle including a wide-angle region which has a focal length of substantially 28 mm on a 35 mm single lens reflex camera basis, and having excellent optical performance especially including favorably corrected lateral chromatic aberration.

In order to achieve the object mentioned above, according to a first aspect of the present invention, a zoom lens comprises a first lens unit having an overall negative power and a second lens unit disposed behind the first lens unit, having a positive power, and during zooming, at least the second lens unit is moved so that the space between the first lens unit and the second lens unit is changed, in which (A1) the first lens unit comprises at least two negative lens elements and at least one positive lens element, (A2) the second lens unit comprises at least two positive lens elements and at least one negative lens element, (A3) at least one of the first lens unit and the second lens unit comprises a diffractive optical element, and (A4) the following conditions are satisfied:

$$DaW > DaT$$

and $$10 < |fDOE|/ft < 500,$$

where DaW and DaT represent the spaces between the first lens unit and the second lens unit at a wide-angle end and at a telephoto end, respectively; fDOE represents the focal length only due to diffraction of the diffractive optical element; and ft represents the focal length of the entire system at the telephoto end.

In accordance with a second aspect of the present invention, a zoom lens comprises a first lens unit having a negative optical power, a second lens unit having a negative optical power, and a third lens unit having a positive optical power, from an object side in that order, in which during zooming, the spaces between the first lens unit and the second lens unit and between the second lens unit and the third lens unit are changed, and at least one of the first lens unit, the second lens unit, and the third lens unit comprises a diffractive optical element.

Further objects, features and advantages of the present invention will become apparent from the following description of the preferred embodiments with reference to the attached drawings.

BRIEF DESCRIPTION OF THE DRAWINGS

FIGS. 2A through 2D are aberration diagrams at a wide-angle end of the zoom lens according to the first numerical embodiment.

FIGS. 3A through 3D are aberration diagrams at a telephoto end of the zoom lens according to the first numerical embodiment.

FIGS. 5A through 5D are aberration diagrams at the wide-angle end of the zoom lens according to the second numerical embodiment.

FIGS. 6A through 6D are aberration diagrams at the telephoto end of the zoom lens according to the second to numerical embodiment.

FIGS. 8A through 8D are aberration diagrams at the wide-angle end of the zoom lens according to the third numerical embodiment.

FIGS. 9A through 9D are aberration diagrams at the telephoto end of the zoom lens according to the third numerical embodiment.

FIGS. 11A through 11D are aberration diagrams at the wide-angle end of the zoom lens according to the fourth numerical embodiment.

FIGS. 12A through 12D are aberration diagrams at the telephoto end of the zoom lens according to the fourth numerical embodiment.

DESCRIPTION OF THE PREFERRED EMBODIMENTS

Figure 1:
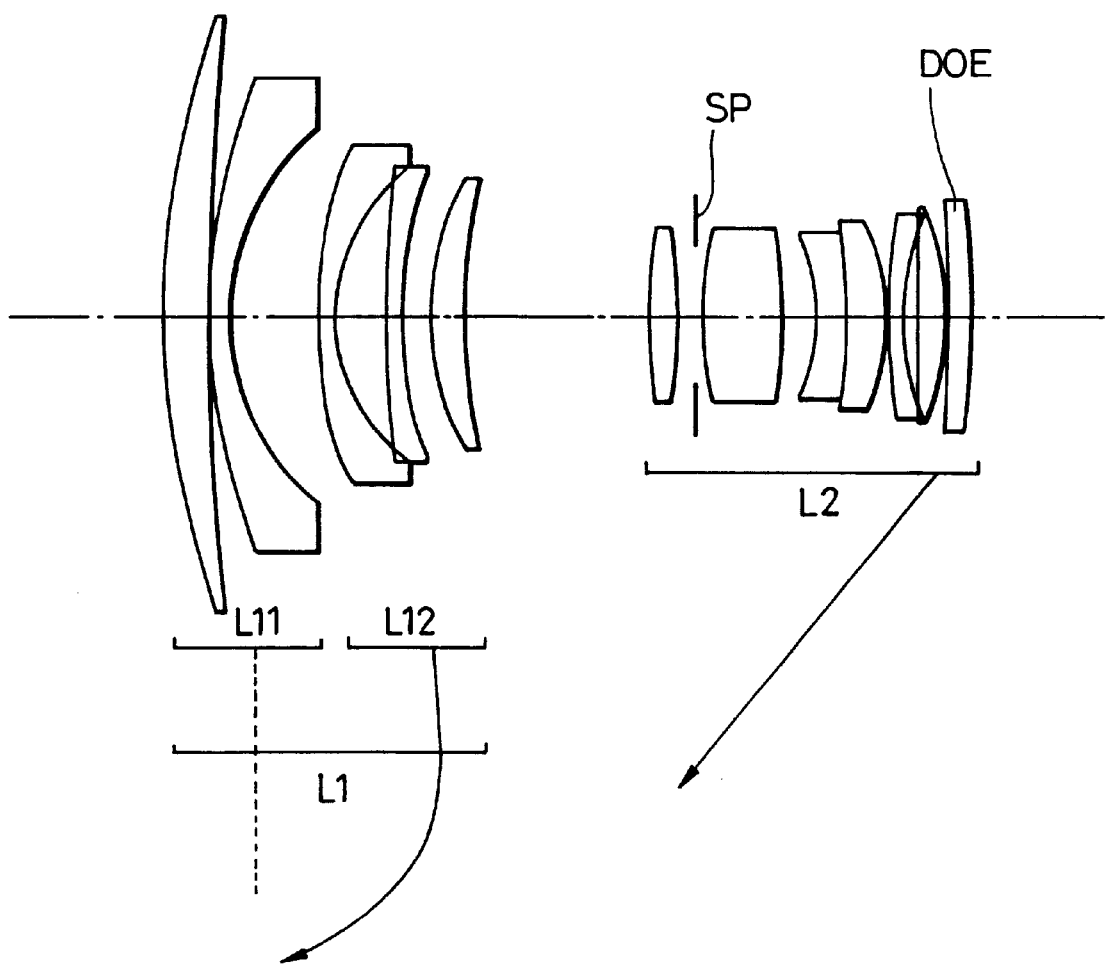
FIG. 1 is a sectional view of a zoom lens according to a first numerical embodiment.

FIG. 1 is a sectional view of a zoom lens according to a first numerical embodiment of the present invention; FIGS. 2A through 2D and 3A through 3D are aberration diagrams of the zoom lens according to the first numerical embodiment at a wide-angle end and at a telephoto end, respectively.

Figure 4:
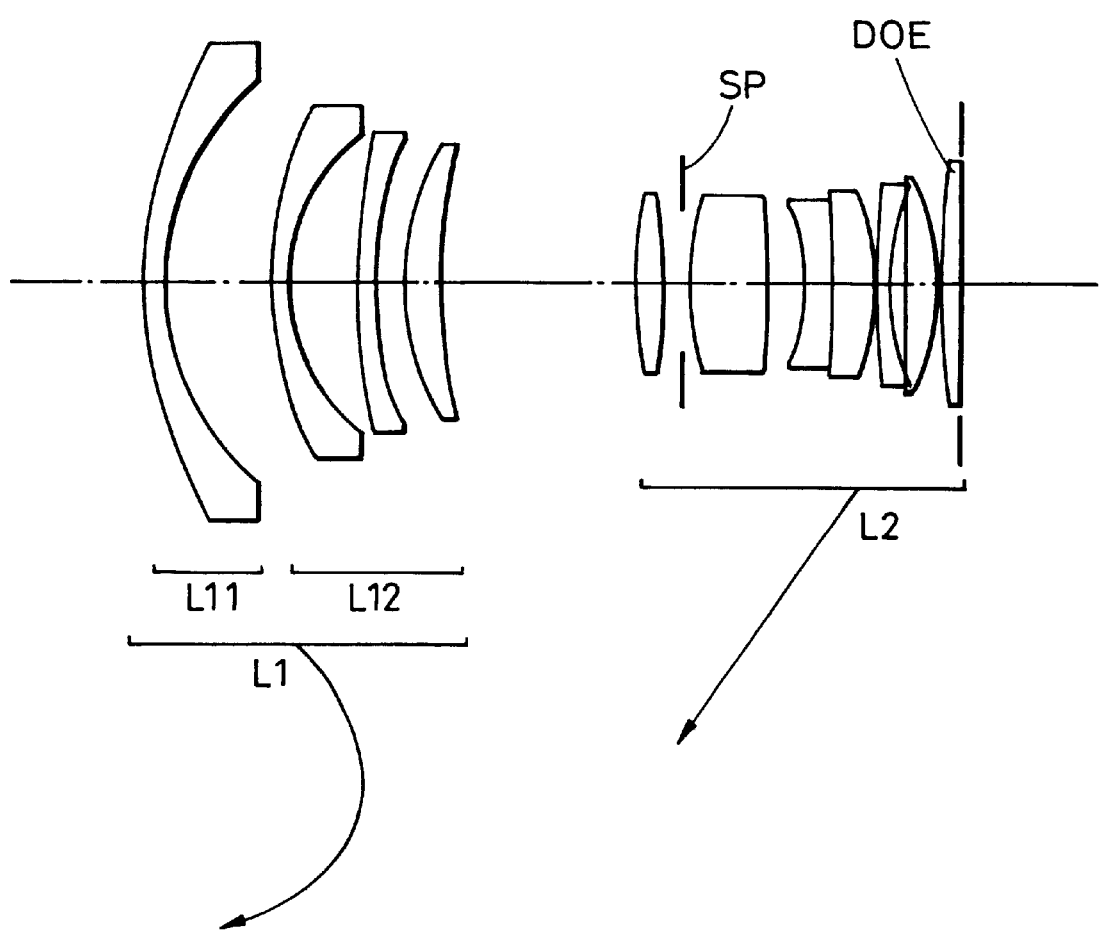
FIG. 4 is a sectional view of a zoom lens according to a second numerical embodiment.

FIG. 4 is a sectional view of a zoom lens according to a second numerical embodiment of the present invention; FIGS. 5A through 5D and 6A through 6D are aberration diagrams of the zoom lens according to the second numerical embodiment at the wide-angle end and at the telephoto end, respectively.

Figure 7:
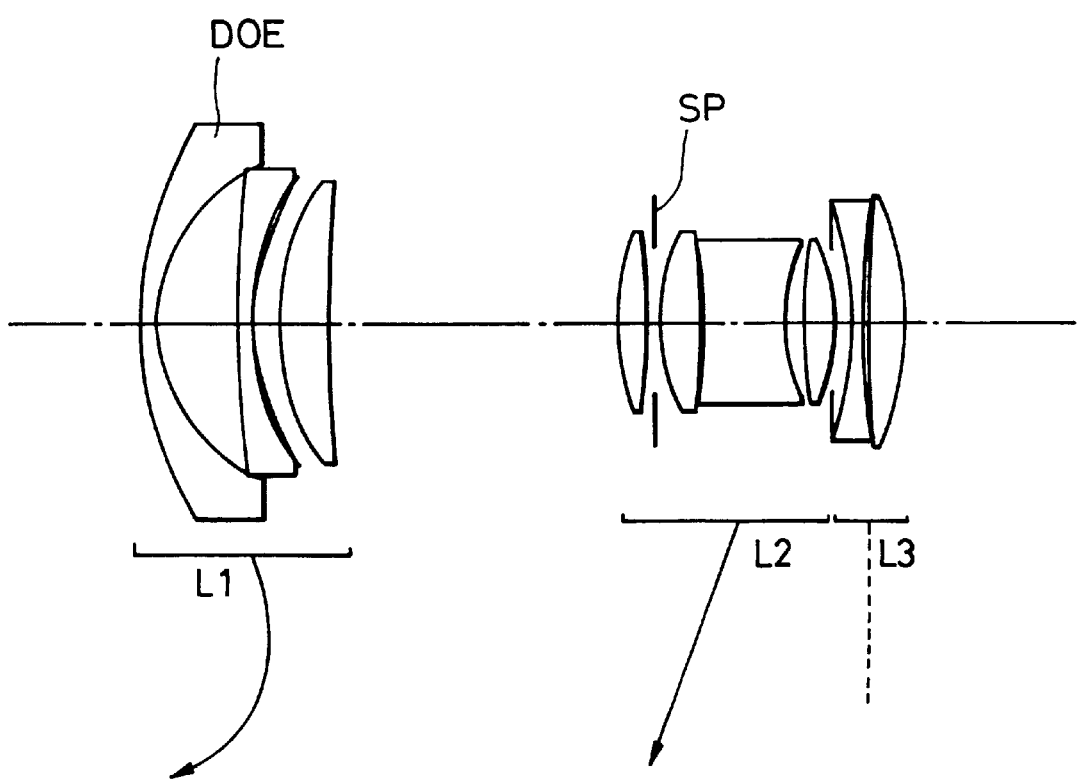
FIG. 7 is a sectional view of a zoom lens according to a third numerical embodiment.

FIG. 7 is a sectional view of a zoom lens according to a third numerical embodiment of the present invention; FIGS. 8A through 8D and 9A through 9D are aberration diagrams of the zoom lens according to the third numerical embodiment at the wide-angle end and at the telephoto end, respectively.

Figure 10:
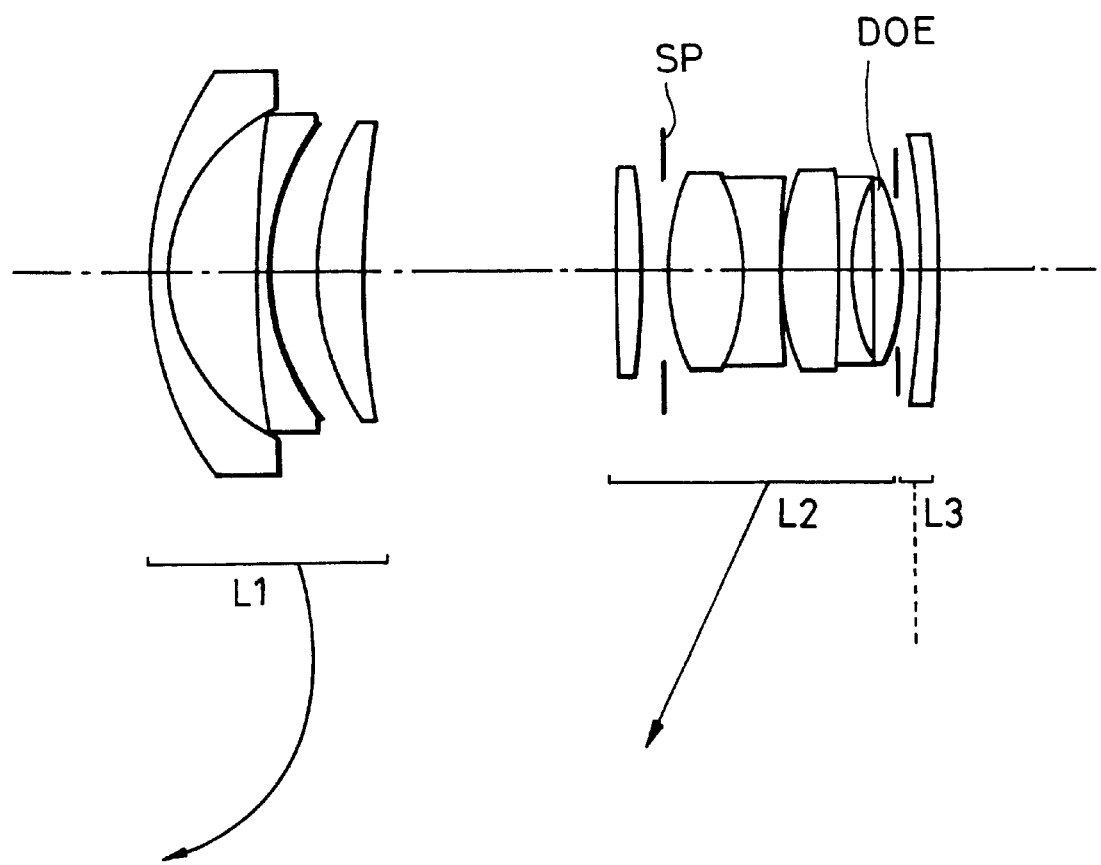
FIG. 10 is a sectional view of a zoom lens according to a fourth numerical embodiment.

FIG. 10 is a sectional view of a zoom lens according to a fourth numerical embodiment of the present invention; FIGS. 11A through 11D and 12A through 12D are aberration diagrams of the zoom lens according to the fourth numerical embodiment at the wide-angle end and at the telephoto end, respectively.

In the sectional views, L1 denotes a first lens unit having a negative optical power (i.e., an inverse number of a focal length), and in the first and second numerical embodiments shown in FIGS. 1 and 4, there are provided two lens subunits of a first lens subunit L11 and a second lens sub unit L12 both of which have a negative optical power.

L2 denotes a second lens unit having a positive optical power.

Also, in the third and fourth numerical embodiments shown in FIGS. 7 and 10, there is provided a fixed third lens unit L3 on an image-plane side of the second lens unit L2. SP denotes an aperture diaphragm for determining the brightness of the optical system.

In the first numerical embodiment shown in FIG. 1, during zooming from the wide-angle end to the telephoto end, the second lens subunit L12 is moved following a locus which is convex toward the image while the second lens unit L2 is moved toward the object side. The first lens subunit L11 does not move for the zooming. Therefore, the zoom lens according to the first numerical embodiment may also be considered as a zoom lens comprising three units in which it is presumed that the first lens subunit L11 is a first lens unit having the negative optical power, the second lens subunit L12 is a second lens unit having the negative optical power, and the second lens unit L2 is a third lens unit having the positive optical power.

On the other hand, in the second to fourth embodiments shown in FIGS. 4, 7, and 10, during zooming from the wide-angle end to the telephoto end, the entire first lens unit L1 is moved following a locus which is convex toward the image while the second lens unit L2 is moved toward the object side. In any of the embodiments, the diaphragm SP is moved integrally with the second lens unit L2 during the zooming.

In addition, in each aberration diagram, a solid line of the spherical aberration diagram denotes a d-line, a two-dot chain line denotes a g-line, a dotted chain line denotes a C-line, a dotted line denotes an F-line, and a chain line denotes a sine condition. A solid line of the astigmatism diagram denotes a sagittal ray, and a dotted line denotes a meridional ray. A two-dot chain line of the diagram of lateral chromatic aberration denotes a g-line, a dotted chain line denotes a C-line, and a dotted line denotes an F-line.

In a zoom lens of any numerical embodiments described in the embodiment, a first lens unit L1 comprises at least two negative lenses and at least one positive lens, and a second lens unit L2 comprises at least two positive lenses and at least one negative lens. At least one of the first lens unit L1 and the second lens unit L2 comprises a diffractive optical element DOE. When DaW and DaT represent the spaces between the first lens unit L1 and the second lens unit L2 at the wide-angle end and at the telephoto end, respectively; fDOE represents the focal length due to only the diffraction function of the diffractive optical element DOE; and ft represents the focal length of the entire system at the telephoto end, the following conditions are satisfied:

$$DaW > DaT \quad (1)$$

and $$10 < |fDOE|/ft < 500 \quad (2)$$

The condition (1) specifies a moving state of the two lens units during zooming, and by moving each lens unit so as to satisfy the condition (1), a desired variable power ratio is effectively obtained while miniaturizing the entire lens system.

Also, by setting an optical power due to a diffraction function of the diffractive optical element DOE so as to satisfy the condition (2), lateral chromatic aberration over the wide wavelength range from a g-line to a c-line is satisfactorily corrected. In addition, in the embodiment, a lens having a diffractive portion is designated as a diffractive optical element.

As described above, by properly setting the lens configuration of each lens unit in addition to using the diffractive optical element in the negative lead type zoom lens, a high-optical-performance zoom lens is achieved in which the overall length of the lens is reduced with high variable power ratio and chromatic aberration is corrected over the entire variable power range.

On a diffraction surface of the diffractive optical element DOE, a diffraction grating is formed, which is rotationally symmetric with respect to an optical axis and gives a phase expressed by the following equation:

$$\phi(h) = 2\pi/\lambda (C1 \times h^2 + C2 \times h^4 + C3 \times h^6 + ) \quad (a)$$

where $\lambda$ denotes a base wavelength (a d line);

h denotes a distance from the optical axis; and $\phi$ (h) denotes the phase. A portion giving the phase expressed by the equation (a) is called as a diffractive portion of the diffractive optical element DOE, which has a predetermined thickness; however, because the thickness is negligible small in geometrical optics, it may be called as a diffraction optical surface (diffraction surface) neglecting the thickness.

A diffractive portion of the diffractive optical element DOE has characteristics different from refraction.

Abbe constant vd of a diffractive portion of the diffractive optical element DOE is given by the following equation:

$$vd = \lambda d/(\lambda F - \lambda C),$$

where $\lambda d$, $\lambda F$, and $\lambda C$ denote wavelengths of a d line, an F line, and a C line, respectively.

As is understood from the equation, the diffractive portion of the diffractive optical element DOE has features of negative dispersion and anomalous dispersion. Specifically, Abbe constant vd=−3.45, and partially dispersion ratio θg, d=0.296.

In addition, the pitch of the diffraction grating may be changed so as to have an aspheric effect. In particular, a higher-order term of the phase in the equation (a) is optimized so as to obtain excellent optical performance.

In order to obtain high optical performance, the zoom lens according to the embodiment satisfies at least one of the following conditions:

(A-1) The first lens unit L1 includes the diffractive optical element DOE, and the optical power due to only diffraction of the diffractive optical element DOE at this time is negative.

As a result, lateral chromatic aberration in variable power is corrected over the entire optical power range in a well-balanced state.

(A-2) The second lens unit L2 includes the diffractive optical element DOE, and the optical power due to only diffraction of the diffractive optical element DOE at this time is positive.

As a result, lateral chromatic aberration in variable power is corrected over the entire optical power range in a well-balanced state.

(A-3) The following conditions are satisfied:

$$0.85 < |fa|/\sqrt{(fw \cdot ft)} < 1.1 \quad (3)$$

and $$0.8 < fb/\sqrt{(fw \cdot ft)} < 1.2 \quad (4)$$

where fw and ft denote focal lengths of the entire system at the wide-angle end and at the telephoto end, respectively;

fa denotes the focal length of the first lens unit L1 at the wide-angle end; and fb represents the focal length of the second lens unit L2.

In addition, the reason why fa is specified at the wide-angle end is that the focal length of the first lens unit L1 may be changed due to a zoom position as in the first numerical embodiment shown in FIG. 1.

The condition (3) defines the focal length range of the first lens unit L1 relative to the square root of the product of the focal length at the wide-angle end and the focal length at the telephoto end, while the condition (4) defines the focal length range of the second lens unit L2 relative to the square root of the product of the focal length at the wide-angle end and the focal length at the telephoto end. In the both conditions, when the optical power of the first lens unit L1 or of the second lens unit L2 is intensified beyond the lower limit, although it is advantageous for miniaturizing of the lens system, various kinds of aberration produced in each lens unit are increased so that it is difficult to correct them in a well-balanced state. On the other hand, when the optical power of the first lens unit L1 or of the second lens unit L2 is weakened beyond the upper limit, although it is advantageous for aberration correction, the total length and front cell diameter are increased.

(A-4) The following condition is satisfied:

$$1.4 < SKw/fw < 2.0 \quad (5)$$

where SKw denotes the back focus of an entire system at the wide-angle end; and fw denotes the focal length of the entire system at the wide-angle end.

The condition (5) defines the back focus at the wide-angle end relative to the focal length at the wide-angle end and is the condition for effectively ensuring the arrangement space of a quick-return mirror and so forth.

(A-5) The following condition is satisfied:

$$-25° < \theta < 25° \quad (6)$$

where θ denotes an angle between a ray incident on a diffraction surface of the diffractive optical element DOE and a normal of the diffraction surface, or it denotes an angle between a ray emitting from the diffraction surface and the normal of the diffraction surface.

The condition (6) specifies a preferable angle θ° of a light ray being incident on or emitting from the diffraction plane, at which the chromatic aberration correction by the diffractive optical element is excellently obtained over the wide wavelength range, and in particular the lateral chromatic aberration is excellently corrected.

In addition, even when the angle θ is in the following range, advantages are obtained to some extent:

$$-45° < \theta < 45°$$

(A-6) A diffractive portion of the diffractive optical element DOE is provided with a plurality of layers of diffraction gratings.

As a result, high diffraction efficiency can be readily ensured over the wide wavelength range.

In general, the diffraction efficiency at a design order (the first order, for example) of the diffraction grating decreases as the light-ray wavelength is separated from the optimized value, although the diffraction ray at the order other than the design order tends to increase, especially in the zero order and the second order which are neighborhood orders.

The increase in the diffraction ray at an order other than the design order reduces the resolution of the optical system because the diffraction ray becomes a flare when approaching the image plane. On the other hand, by piling up diffraction gratings formed of optical materials having different refraction indexes to form a multi-layered structure, the diffraction efficiency at the design order can be maintained over the wide wavelength region.

In the embodiment, the diffractive portion of the multi-layered structure is adopted so as to obtain excellent images.

In this case, the grating may also not be formed on the surface of the diffractive optical element, thereby obtaining an inexpensive optical system with high dustproof characteristics and high efficiency during assembling of the diffractive optical element.

The specific multi-layered structure of the diffraction grating will be described later.

Features of a lens configuration according to each numerical embodiment will be described.

(First Numerical Embodiment)

A first lens unit L1 comprises a first lens subunit L11 and a second lens subunit L12, each having a negative optical power; the first lens subunit L11 comprises a positive meniscus lens having a convex shape in an object side and a negative meniscus lens having a convex shape at the object side; the second lens subunit L12 comprises a negative meniscus lens having a convex surface at the object side, a negative lens, and a positive lens; and the second lens unit L2 comprises a plurality of positive lenses and a plurality of negative lenses. During zooming from a wide-angle end to a telephoto end, the first lens subunit L11 is fixed; the second lens subunit L12 is moved following a locus which is convex toward the image; and the second lens unit L2 is moved toward the object side. By arranging the positive lens at the most object side of the first lens subunit L11, distortion is excellently corrected.

In the most image-plane side of the second lens unit L2, a diffractive optical element DOE comprising a diffractive portion having a positive optical power and satisfying the condition (2) is arranged so that lateral chromatic aberration is excellently corrected from a g-line to a C-line.

The paraxial arrangement satisfies the conditions (3), (4), and (5).

Focusing is performed by the second lens subunit L12 in the first lens unit L1. The focusing by such a lightweight lens unit enables prompt auto-focusing when it is equipped to an auto-focus camera, which has become a mainstream camera recently in 35 mm single lens reflex cameras.

(Second Numerical Embodiment)

The first lens unit L1 comprises two negative meniscus lenses having a convex surface on the object side, a negative lens, and a positive lens. The lens surface on the image plane side of the lens in the portion closest to the object has an aspheric shape in which the negative optical power decreases gradually from the center toward the periphery of the lens, so that barrel distortion produced at the wide-angle side is reduced. The second lens unit L2 comprises a plurality of positive lenses and a plurality of negative lenses. During zooming from the wide-angle end to the telephoto end, the first lens unit L1 is moved following a locus that is convex toward the image; and the second lens unit L2 is moved toward the object side.

In the portion of the second lens unit L2 closest to the image plane, the diffractive optical element DOE comprising a diffractive portion having a positive optical power and satisfying the condition (2) is arranged so that lateral chromatic aberration is excellently corrected from the g line to the C line.

The paraxial arrangement also satisfies the conditions (3), (4), and (5) just as in the first numerical embodiment.

Focusing is performed by the second lens subunit L12 of the first lens unit L1 except for the first lens subunit L11. The focusing by such a lightweight lens unit enables prompt auto focusing when it is equipped on an auto-focus camera, which has become a mainstream camera recently in 35 mm single lens reflex cameras.

(Third Numerical Embodiment)

The first lens unit L1 comprises a negative meniscus lens having a convex surface on the object side, a negative lens, and a positive lens. The lens surface on the image side of the lens second closest to the object side has an aspheric shape in which the negative optical power decreases gradually from the center toward the periphery of the lens, so that barrel distortion produced at the wide-angle side is reduced. The second lens unit L2 comprises a plurality of positive lenses and a plurality of negative lenses. At the image side of the second lens unit L2, a third lens unit L3 having a slightly negative optical power is arranged, which is fixed during zooming. During the zooming from the wide-angle end to the telephoto end, the first lens unit L1 is moved following a locus which is convex toward the image; and the second lens unit L2 is moved toward the object side.

The negative meniscus lens of the first lens unit L1 closest to the object side is the diffractive optical element DOE which has a diffractive portion on its image-side surface, the diffractive portion having a negative optical power and satisfying the condition (2), so that lateral chromatic aberration is excellently corrected from the g-line to the C-line.

The paraxial arrangement also satisfies the conditions (3), (4), and (5) just as in the first numerical embodiment.

(Fourth Numerical Embodiment)

The first lens unit L1 comprises a negative meniscus lens having a convex surface on its object side, a negative lens, and a positive lens. The lens surface on the image side of the negative lens second closest to the object side has an aspheric shape, in which the negative optical power decreases gradually from the center toward the periphery of the lens, so that barrel distortion produced at the wide-angle side is reduced. The second lens unit L2 comprises a plurality of positive lenses and a plurality of negative lenses. At the image side of the second lens unit L2, the third lens unit L3 having a slightly negative optical power is arranged, which is fixed during zooming. During the zooming from the wide-angle end to the telephoto end, the first lens unit L1 is moved following a locus which is convex toward the image; and the second lens unit L2 is moved toward the object side.

The lens of the second lens unit L2 closest to the image side is the diffractive optical element DOE which has a diffractive portion on the image side surface, the diffractive portion having a positive optical power and satisfying the condition (2), so that lateral chromatic aberration is excellently corrected from the g-line to the C-line.

The paraxial arrangement also satisfies the conditions (3), (4), and (5), just as in the first numerical embodiment.

Next, the diffractive portion of the diffractive optical element DOE according to the embodiment will be described. The diffractive optical element may be produced by binary optics which is an optical element produced by a lithographic method in a binary fashion, which is a method of producing a holographic optical element. It may also be produced with a mold produced with these methods. Also, it may be produced by a method for transferring a plastic film on an optical plane as the diffraction optical plane (a so-called replica method).

Figure 13:
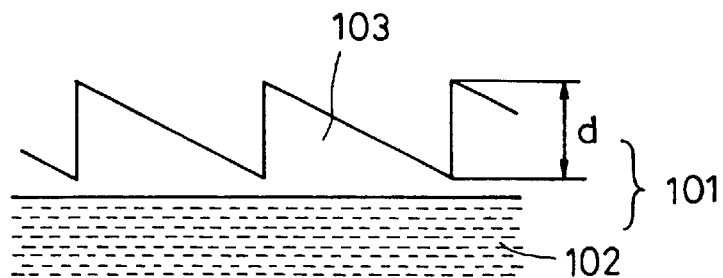
FIG. 13 is an enlarged sectional view of an example of a diffractive optical element.
Figure 14:
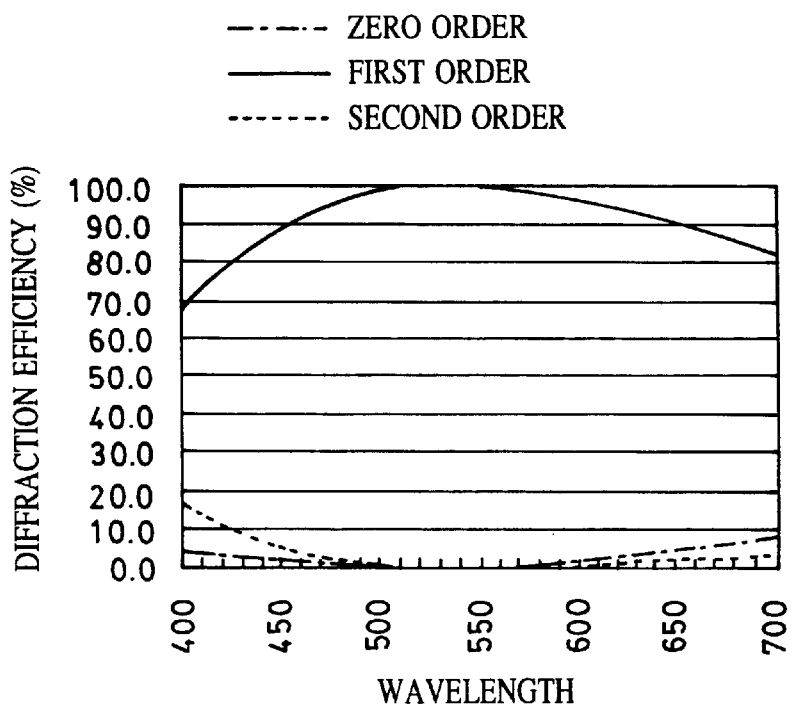
FIG. 14 is a graph showing a representation of wavelength dependent characteristics of the diffractive optical element shown in FIG. 13.

A kinoform shape shown in FIG. 13 may be applied to the diffraction grating, for example. FIG. 14 shows wavelength-dependent characteristics of optical diffraction efficiency at the plus first order of the diffractive optical element shown in FIG. 13. In the practical structure of the diffraction grating, the surface of a base material 102 is coated with a UV curable resin, and a grating 103 is formed in a resin portion with the grating thickness d, so that the optical diffraction efficiency at the plus first order becomes 100% in a wavelength of 530 nm.

As is apparent from FIG. 14, the diffraction efficiency at the design order is reduced as the wavelength is separated from an optimized value of 530 nm. On the other hand, the diffraction ray increases at orders neighboring the design order, which are the zero and second orders. The increase in the diffraction ray at the orders other than the design order reduces the resolution of the optical system because the diffraction ray becomes flare.

Figure 15:
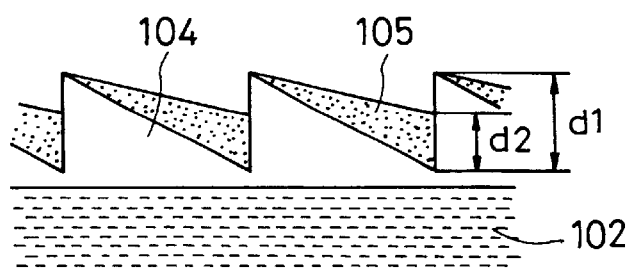
FIG. 15 is an enlarged sectional view of a diffractive optical element having a layered type diffraction grating.

Then, a layered type diffraction grating shown in FIG. 15 may be used as a grating shape of the diffractive portion of the diffractive optical element according to the embodiment. FIG. 15 shows that the first diffraction grating 104 made of a UV curable resin is formed on a base material 102 while the second diffraction grating 105 made of a UV curable resin is formed on the first diffraction grating 104.

Figure 16:
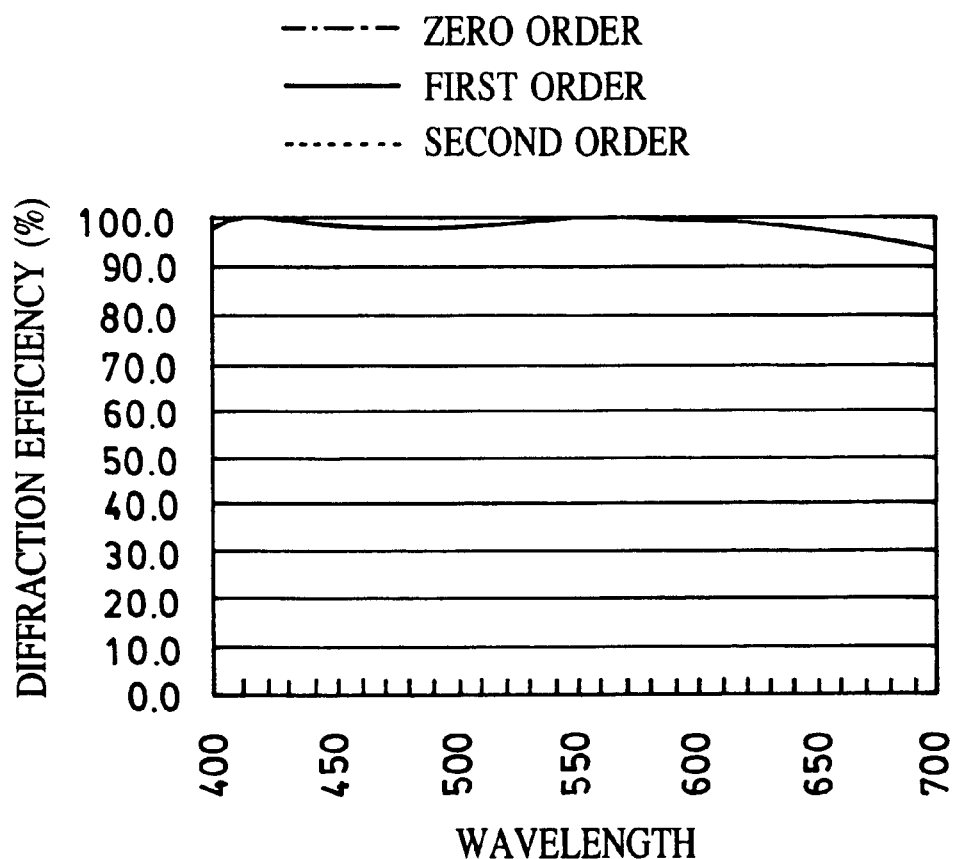
FIG. 16 is a graph showing a representation of wavelength dependant characteristics of the diffractive optical element shown in FIG. 15.

FIG. 16 shows wavelength-dependent characteristics of the optical diffraction efficiency at the plus first order of the diffractive optical element in this structure.

As a specific structure, a first diffraction grating 104 made on a base material with a UV curable resin (nd=1.449, vd=54) is formed, on which a second diffraction grating 105 made of a different UV curable resin (nd=1.598, vd=28) is formed. In the combination of these materials, the grating thickness of a first diffraction grating portion is d1, d1=13.8 µm, while the grating thickness of a second diffraction grating portion is d2, d2=10.5 µm.

As is understood from FIG. 16, when the diffractive portion is formed of a diffraction grating of a layered structure, the diffraction efficiency at the design order has values of 95% or more over the entire wavelength range used.

Figure 17:
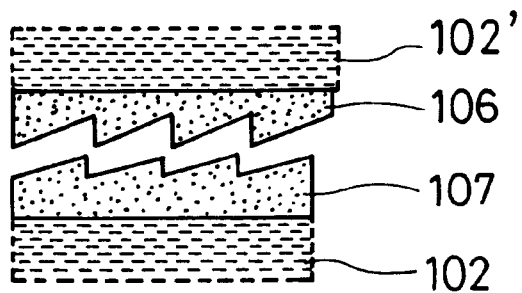
FIG. 17 is an enlarged sectional view of a diffractive optical element having a layered type diffraction grating with an air layer sandwiched therebetween.

Furthermore, a two-layered structure sandwiching an air-gap as shown in FIG. 17 may be applied.

Figure 18:
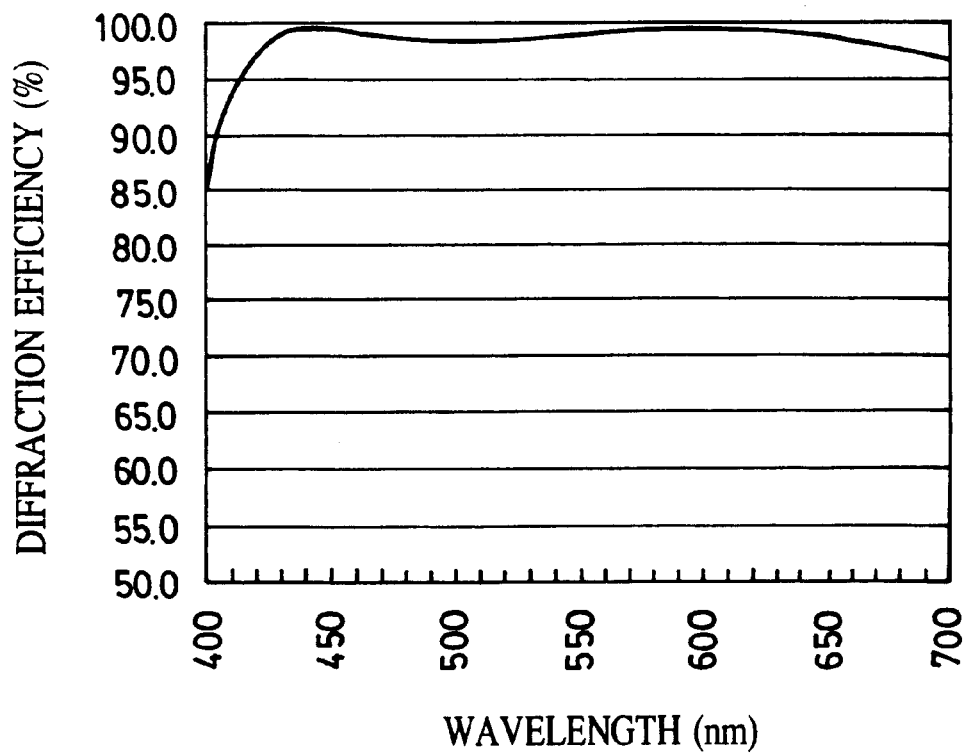
FIG. 18 is a graph showing a representation of wavelength dependant characteristics of the diffractive optical element shown in FIG. 17.

FIG. 18 shows wavelength-dependent characteristics of diffraction efficiency at the first optical order of the diffractive optical element using two diffraction gratings 106 and 107 shown in FIG. 17.

FIG. 17 shows that the first diffraction grating 106 made of a UV curable resin is formed on a base material 102 while the second diffraction grating 107 made of a UV curable resin is formed on a base material 102'.

As is understood from FIG. 18, the diffraction efficiency at the design order has values of 95% or more over the entire wavelength range used.

When the diffractive portion of the diffractive optical element DOE uses the diffraction grating of the layered structure in such a manner, the optical performance is furthermore improved.

In addition, the material of the diffractive optical element having the layered structure described above is not limited to the UV curable resin; however, other plastic materials may be used, and the first diffraction grating may be directly formed on the base material depending on the material of the base.

Figure 19:
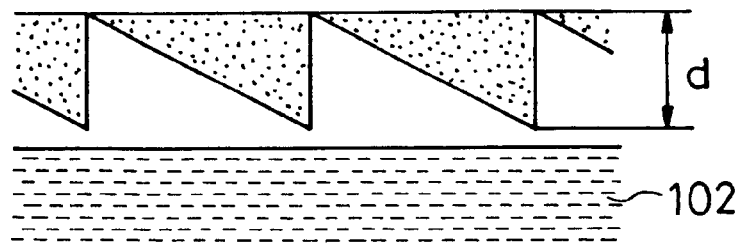
FIG. 19 is an enlarged sectional view of a diffractive optical element having another layered type diffraction grating.

Each grating thickness need not be different; the thickness of two gratings may be the same as shown in FIG. 19, depending on the combination of the materials. In this case, the grating is not formed on the surface of the diffractive optical element, thereby providing an inexpensive optical system with high dustproof and high efficiency of assembling of the diffractive optical element.

Next, a lens-shutter camera (an optical instrument) using the zoom lens according to the embodiment as an image pick-up optical system will be described with reference to FIG. 20.

Figure 20:
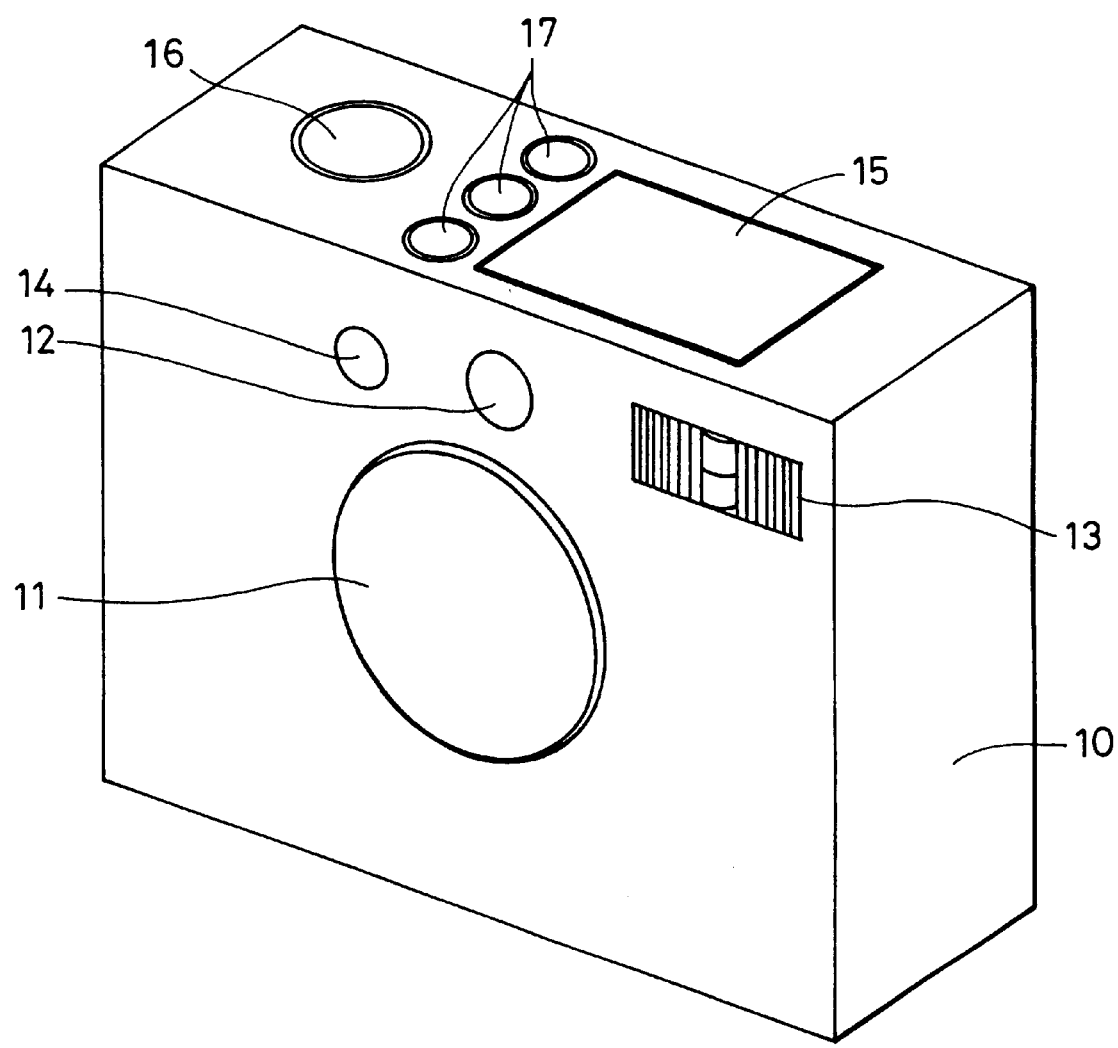
FIG. 20 is a perspective view of a lens shutter camera.

Referring to FIG. 20, the camera comprises a camera body 10, an image pick-up optical system 11 formed of the zoom lens described above, a finder 12 for observing an object, a stroboscopic device 13, a light measuring window 14, a liquid crystal display 15 for displaying the operation of the camera, a release button 16, and an operational switch 17 for switching the camera among various modes.

Figure 21:
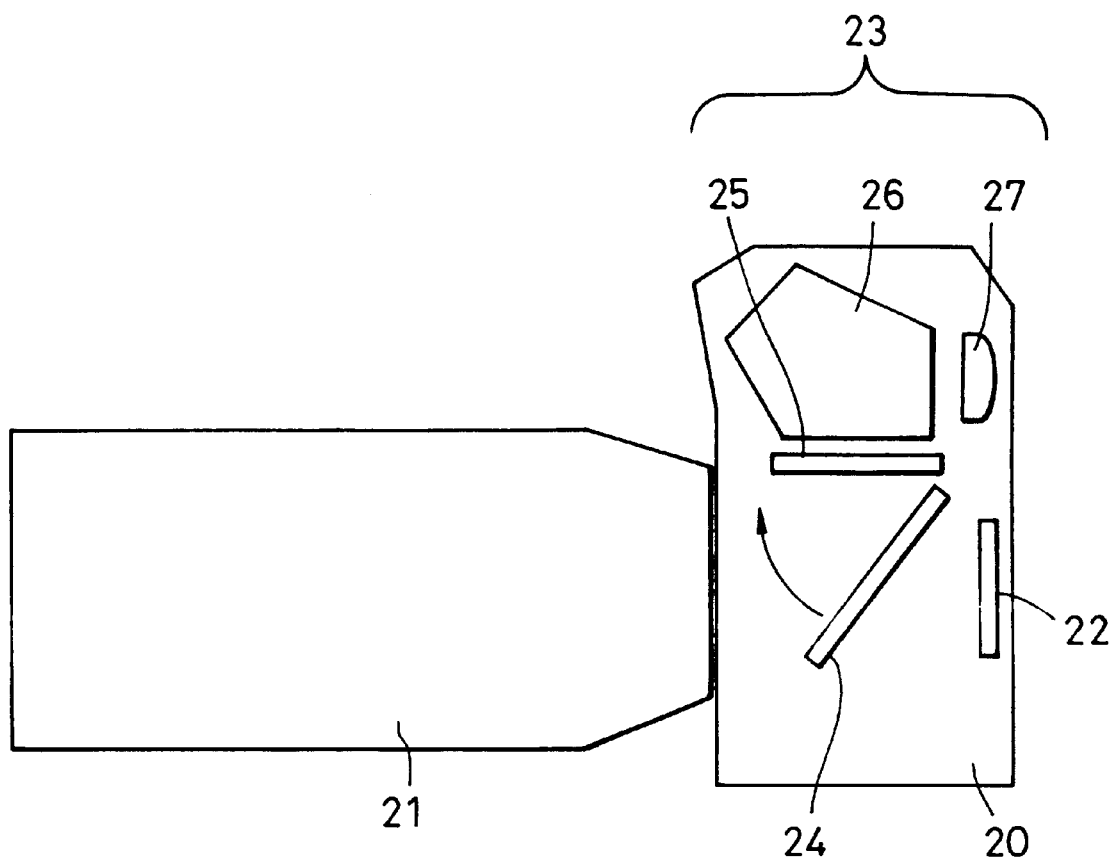
FIG. 21 is a sectional side view of a single lens reflex camera.

FIG. 21 is a schematic view of an essential part of an optical instrument when the zoom lens according to the Ip embodiment is applied to a single lens reflex camera such as a film camera and a digital camera.

Referring to FIG. 21, the optical instrument comprises a camera body 20; a zoom lens 21 according to the present invention; image-picking up means 22 comprising a silver halide film or a CCD (a photoelectric conversion element); a finder system 23 comprising a focal-plane plate 25 for forming images, a penta prism 26 as image inversion means, and an eyepiece 27 for observing images on the focal-plane plate 25; and a quick-return mirror 24.

Next, numerical data of the numerical embodiments 1 to 4 will be discussed.

In each numerical embodiment, ri denotes the radius of curvature of the i-th plane from the object side; di denotes the space between the i-th plane and i+1-th plane from the object side; and ni and vi are the refractive index and the Abbe constant of the i-th optical member from the object side, respectively. FNO denotes the F-number and ω denotes the half angle of view.

The aspheric surface is rotationally symmetrical, and when r denotes a reference radius of curvature, h denotes the radial distance from the optical axis of the lens, and b, c, d, and e denote aspheric coefficients, a coordinate in an optical axial direction Z(h) is expressed by the following equation.

$$Z(h) = \frac{h^2/r}{1 + \sqrt{1 - \frac{h^2}{r^2}}} + bh^4 + ch^6 + dh^8 + eh^{10} + \ldots$$

[NUMERICAL VALUE 7]

In the phase equation expressing a diffraction surface, the coefficients of the equation (a) are written. At this time, the design order is the plus first, and the design wavelength is the d-line.

[e−x] denotes [$10^{-x}$].

Functions to numerical values in the conditions and the numerical embodiments are shown in Table 1.

[APPENDIX 1]
First Numerical Embodiment

| f 20.6 to 34.1 | Fno = 1: 3.6 to 4.6 | 2ω = 92.8° to 64.8° | | |
|---|---|---|---|---|
| r 1 = | 79.714 | d 1 = | 4.10 | n 1 = 1.62299  ν 1 = 58.1 |
| r 2 = | 259.030 | d 2 = | 0.10 | |
| r 3 = | 58.293 | d 3 = | 1.70 | n 2 = 1.78590  ν 2 = 44.2 |
| r 4 = | 22.586 | d 4 = | VARIABLE | |
| r 5 = | 41.901 | d 5 = | 1.40 | n 3 = 1.80610  ν 3 = 41.0 |
| r 6 = | 16.810 | d 6 = | 4.69 | |
| r 7 = | 124.961 | d 7 = | 1.30 | n 4 = 1.77250  ν 4 = 49.6 |
| r 8 = | 36.441 | d 8 = | 2.80 | |
| r 9 = | 26.030 | d 9 = | 3.00 | n 5 = 1.84666  ν 5 = 23.8 |
| r10 = | 61.760 | d10 = | VARIABLE | |
| r11 = | 63.155 | d11 = | 2.20 | n 6 = 1.58313  ν 6 = 59.4 |
| r12 = | −67.564 | d12 = | 1.78 | |
| r13 = | (DIAPHRAGM) | d13 = | 0.92 | |
| r14 = | 40.454 | d14 = | 6.90 | n 7 = 1.62606  ν 7 = 39.2 |
| r15 = | −65.076 | d15 = | 3.50 | |
| r16 = | −16.751 | d16 = | 2.50 | n 8 = 1.84666  ν 8 = 23.8 |
| r17 = | −64.033 | d17 = | 3.80 | n 9 = 1.78590  ν 9 = 44.2 |
| r18 = | −20.983 | d18 = | 0.20 | |
| r19 = | 54.385 | d19 = | 1.20 | n10 = 1.83481  ν10 = 42.7 |
| r20 = | 24.012 | d20 = | 1.37 | |
| r21 = | 272.074 | d21 = | 2.50 | n11 = 1.49700  ν11 = 81.5 |
| r22 = | −26.692 | d22 = | 0.20 | |
| r23 = | −251.396 | d23 = | 2.15 | n12 = 1.49700  ν12 = 81.5 |
| r24 = | −81.678 | d24 = | VARIABLE (DIFFRACTION SURFACE) | |

| | Focal length | | |
|---|---|---|---|
| Variable space | 20.60 | 23.99 | 34.08 |
| D  4 | 8.13 | 10.15 | 8.14 |
| D 10 | 16.79 | 10.45 | 1.47 |
| D 24 | 0.00 | 4.31 | 15.31 |

24th SURFACE (DIFFRACTION SURFACE)
| C1 | C2 | C3 |
|---|---|---|
| −3.69445e−4 | −8.31813e−8 | −6.71669e−9 |
| SKw = 38.31 | | |

[APPENDIX 2]
Second Numerical Embodiment

| f = 20.6 to 34.1 | Fno = 1: 3.6 to 4.6 | 2ω = 92.8° to 64.8° | | |
|---|---|---|---|---|
| r 1 = | 42.880 | d 1 = | 1.70 | n 1 = 1.78590  ν 1 = 44.2 |
| r 2 = | 22.221 | d 2 = | VARIABLE (ASPHERIC SURFACE) | |
| r 3 = | 36.075 | d 3 = | 1.40 | n 2 = 1.80610  ν 2 = 41.0 |
| r 4 = | 17.440 | d 4 = | 6.48 | |
| r 5 = | 79.478 | d 5 = | 1.30 | n 3 = 1.77250  ν 3 = 49.6 |
| r 6 = | 34.019 | d 6 = | 2.80 | |
| r 7 = | 26.360 | d 7 = | 3.00 | n 4 = 1.84666  ν 4 = 23.8 |
| r 8 = | 53.270 | d 8 = | VARIABLE | |
| r 9 = | 42.656 | d 9 = | 2.20 | n 5 = 1.58313  ν 5 = 59.4 |
| r10 = | −85.603 | d10 = | 1.78 | |
| r11 = | (DIAPHRAGM) | d11 = | 0.92 | |
| r12 = | 38.643 | d12 = | 6.90 | n 6 = 1.62606  ν 6 = 39.2 |
| r13 = | −92.606 | d13 = | 3.50 | |
| r14 = | −19.092 | d14 = | 2.50 | n 7 = 1.84666  ν 7 = 23.8 |
| r15 = | −88.570 | d15 = | 3.80 | n 8 = 1.78590  ν 8 = 44.2 |
| r16 = | −25.376 | d16 = | 0.20 | |
| r17 = | 85.666 | d17 = | 1.20 | n 9 = 1.83481  ν 9 = 42.7 |
| r18 = | 24.569 | d18 = | 1.40 | |
| r19 = | 1843.680 | d19 = | 3.00 | n10 = 1.49700  ν10 = 81.5 |
| r20 = | −22.248 | d20 = | 0.20 | |
| r21 = | 81.162 | d21 = | 1.65 | n11 = 1.49700  ν11 = 81.5 |
| r22 = | 500.000 | d22 = | VARIABLE (DIFFRACTION SURFACE) | |

| | Focal length | | |
|---|---|---|---|
| Variable space | 20.61 | 24.41 | 34.07 |
| d  2 | 9.94 | 9.94 | 9.94 |
| d  8 | 17.89 | 11.43 | 1.46 |
| d 22 | 0.00 | 4.31 | 15.31 |

SECOND SURFACE (ASPHERIC SURFACE)
| b | c | d | e |
|---|---|---|---|
| −2.994999e−06 | −2.145976e−08 | 5.675864e−11 | −1.592959e−13 |

22nd SURFACE (DIFFRACTION SURFACE)
| C1 | C2 | C3 |
|---|---|---|
| −3.55308e−4 | 2.33820e−7 | −1.06132e−8 |
| SKw = 37.73 | | |

[APPENDIX 3]
Third Numerical Embodiment

| f = 22.9 to 52.9 | Fno = 1: 3.9 to 5.9 | 2ω = 86.8° to 44.5° | | |
|---|---|---|---|---|
| r 1 = | 35.638 | d 1 = | 1.44 | n 1 = 1.80610  ν 1 = 40.9 |
| r 2 = | 15.779 | d 2 = | 7.64 (DIFFRACTION SURFACE) | |
| r 3 = | 148.249 | d 3 | 1.20 | n 2 = 1.71999  ν 2 = 50.2 |
| r 4 = | 23.500 | d 4 = | 0.09 | n 3 = 1.51282  ν 3 = 50.9 |
| r 5 = | 18.862 | d 5 | 2.62 (ASPHERIC SURFACE) | |
| r 6 = | 24.935 | d 6 = | 4.30 | n 4 = 1.74000  ν 4 = 28.3 |
| r 7 = | 143.967 | d 7 = | VARIABLE | |
| r 8 = | 26.538 | d 8 = | 2.60 | n 5 = 1.51742  ν 5 = 52.4 |
| r 9 = | −63.216 | d 9 | 0.60 | |
| r10 = | (DIAPHRAGM) | d10 = | 0.60 | |
| r11 = | 19.645 | d11 = | 3.50 | n 6 = 1.51742  ν 6 = 52.4 |
| r12 = | −322.190 | d12 = | 0.43 | |
| r13 = | −41.353 | d13 = | 7.50 | n 7 = 1.72825  ν 7 = 28.5 |
| r14 = | 17.293 | d14 = | 1.85 | |
| r15 = | 54.438 | d15 = | 2.50 | n 8 = 1.57099  ν 8 = 50.8 |
| r16 = | −22.312 | d16 = | VARIABLE | |
| r17 = | (FLARE CUTTER) | d17 = | VARIABLE | |
| r18 = | −35.503 | d18 = | 1.00 | n 9 = 1.71999  ν 9 = 50.2 |
| r19 = | 68.537 | d19 = | 0.63 | |
| r20 = | 211.562 | d20 = | 3.40 | n10 = 1.71300  ν10 = 53.9 |
| r21 = | −29.139 | | | |

-continued

|  | Focal length | | |
| --- | --- | --- | --- |
| Variable space | 22.89 | 35.04 | 52.88 |
| -d 7 | 26.64 | 11.01 | 1.07 |
| d 16 | 0.00 | 4.13 | 10.20 |
| d 17 | 1.80 | 7.88 | 16.80 |

| SECOND SURFACE (DIFFRACTION SURFACE) | | |
| --- | --- | --- |
| C1 | C2 | C3 |
| 9.66757e-5 | 1.54736e-6 | -3.11687e-9 |

| FIFTH SURFACE (ASPHERIC SURFACE) | | | |
| --- | --- | --- | --- |
| b | c | d | e |
| -2.510407e-05 | -8.908390e-08 | 2.721332e-10 | -1.457702e-12 |
| SKw = 37.76 | | | |

[APPENDIX 4]

Fourth Numerical Embodiment

| f = 24.8 to 48.1 | Fno = 1: 3.4 to 4.7 | 2ω = 82.1° to 48.4° | |
| --- | --- | --- | --- |
| r 1 = 31.958 | d 1 = 1.71 | n 1 = 1.83400 | ν 1 = 37.2 |
| r 2 = 16.345 | d 2 = 7.75 | | |
| r 3 = 104.983 | d 3 = 1.44 | n 2 = 1.71999 | ν 2 = 50.2 |
| r 4 = 23.540 | d 4 = 0.07 | n 3 = 1.52463 | ν 3 = 47.9 |
| r 5 = 19.858 (ASPHERIC SURFACE) | d 5 = 4.24 | | |
| r 6 = 26.635 | d 6 = 3.91 | n 4 = 1.80518 | ν 4 = 25.4 |
| r 7 = 70.691 | d 7 = VARIABLE | | |
| r 8 = 161.830 | d 8 = 2.40 | n 5 = 1.62280 | ν 5 = 57.0 |
| r 9 = -68.414 | d 9 = 1.90 | | |
| r10 = (DIAPHRAGM) | d10 = 0.70 | | |
| r11 = 24.361 | d11 = 6.90 | n 6 = 1.63930 | ν 6 = 44.9 |
| r12 = -18.901 | d12 = 3.22 | n 7 = 1.80610 | ν 7 = 40.9 |
| r13 = 122.667 | d13 = 0.10 | | |
| r14 = 29.775 | d14 = 4.98 | n 8 = 1.69680 | ν 8 = 55.5 |
| r15 = -209.615 | d15 = 1.29 | n 9 = 1.80518 | ν 9 = 25.4 |
| r16 = 18.586 | d16 = 1.95 | | |
| r17 = -341.367 | d17 = 2.50 | n10 = 1.66680 | ν10 = 33.0 |
| r18 = -22.761 (DIFFRACTION SURFACE) | d18 = VARIABLE | | |
| r19 = 0.000 | d19 = VARIABLE | | |
| r20 = -72.897 | d20 = 1.55 | n11 = 1.51728 | ν11 = 69.6 |
| r21 = -108.822 | | | |

|  | Focal length | | |
| --- | --- | --- | --- |
| Variable space | 24.83 | 28.00 | 48.11 |
| d 7 | 22.74 | 17.68 | 1.13 |
| d 18 | -0.50 | 0.13 | 4.15 |
| d 19 | 2.20 | 4.25 | 17.20 |

| FIFTH SURFACE (ASPHERIC SURFACE) | | | |
| --- | --- | --- | --- |
| b | c | d | e |
| -1.432411e-05 | -6.038119e-08 | 3.229140e-11 | -5.638148e-13 |

| 18th SURFACE (DIFFRACTION SURFACE) | | |
| --- | --- | --- |
| C1 | C2 | C3 |
| -4.75845e-4 | 5.59684e-8 | 1.68345e-9 |
| SKw = 37.77 | | |

TABLE 1

| No | Conditions | Lower limit | Upper limit | First embo. | Second embo. | Third embo. | Fourth embo. |
| --- | --- | --- | --- | --- | --- | --- | --- |
| 2 | \|fDOE\|/ft | 10 | 500 | 40 | 41 | 98 | 22 |
| 3 | \|fa\|/√(fw·ft) | 0.85 | 1.1 | 1.00 | 1.04 | 0.90 | 0.96 |
| 4 | fb/√(fw·ft) | 0.8 | 1.2 | 1.14 | 1.18 | 0.85 | 0.89 |
| 5 | sKw/fw | 1.4 | 2.0 | 1.9 | 1.8 | 1.6 | 1.5 |
| 6 | θ | -25 | 25 | 19.8 | 23.5 | 44.2 | 26.4 |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising:

a first lens system having an overall negative power and comprising at least two negative lens elements and at least one positive lens element; and a second lens unit, disposed behind the first lens system, having a positive power and comprising at least two positive lens elements and at least one negative lens element, wherein during zooming, at least the second lens unit is moved so that the space between the first lens system and the second lens unit is changed, and at least one of the first lens system and the second lens unit comprises a diffractive optical element, wherein the following conditions are satisfied:

$$DaW > DaT$$

and $$10 < |fDOE|/ft < 500,$$

where DaW and DaT represent the spaces between the first lens system and the second lens unit at a wide-angle end and at a telephoto end, respectively;

fDOE represents the focal length only due to diffraction of the diffractive optical element; and ft represents the focal length of the entire system at the telephoto end, and wherein the following condition is satisfied:

$$-25° < \theta < 25°,$$

where θ represents an angle between a ray incident on a diffraction surface of the diffractive optical element and a normal of the diffraction surface, or it represents an angle between a ray emitted from a diffraction surface of the diffractive optical element and a normal of the diffraction surface.

2. A zoom lens according to claim 1, wherein the first lens system comprises the diffractive optical element, and the optical power only due to diffraction of the diffractive optical element included in the first lens system is negative.

3. A zoom lens according to claim 1, wherein the second lens unit comprises the diffractive optical element, and the optical power only due to diffraction of the diffractive optical element included in the second lens unit is positive.

4. A zoom lens according to claim 1, wherein the second lens unit comprises an aperture diaphragm.

5. A zoom lens according to claim 1, wherein the following conditions are satisfied:

$$0.85<|fa|/\sqrt{(fw \cdot ft)}<1.1$$

and $$0.8<fb/\sqrt{(fw \cdot ft)}<1.2,$$

where fW and ft represent focal lengths of the entire system at the wide-angle end and at the telephoto end, respectively;
fa represents a focal length of the first lens system at the wide-angle end; and
fb represents a focal length of the second lens unit.

6. A zoom lens according to claim 1, wherein the following condition is satisfied:

$$1.4<SKw/fw<2.0,$$

where SKw represents a back focus of the entire system at the wide-angle end; and
fw represents a focal length of the entire system at the wide-angle end.

7. A zoom lens according to claim 1, wherein a diffractive portion of the diffractive optical element is provided with a plurality of layers of diffraction gratings.

8. An optical instrument comprising:
an optical element; and
a zoom lens according to claim 1, connected to said optical element.

9. An image pick-up apparatus comprising:
a zoom lens according to claim 1; and
a photoelectric conversion element for receiving an image formed by the zoom lens.

10. A zoom lens according to claim 1, wherein the second lens unit comprises the diffractive optical element, which is disposed at the most image side of the second lens unit.

11. A zoom lens according to claim 10, wherein the diffractive optical element of the second lens unit comprises a lens and a diffraction surface disposed thereupon.

12. A zoom lens according to claim 11, wherein the diffraction surface is disposed on the image side of the lens of the diffractive optical element.

13. A zoom lens according to claim 11, wherein the lens of the diffractive optical element is a positive lens.

14. A zoom lens according to claim 1, wherein the first lens system consists of a negative lens unit.

15. A zoom lens comprising:
a first lens system having an overall negative power and comprising at least two negative lens elements and at least one positive lens element; and
a second lens unit, disposed behind the first lens system, having a positive power and comprising at least two positive lens elements and at least one negative lens element,
wherein during zooming, at least the second lens unit is moved so that the space between the first lens system and the second lens unit is changed, and at least one of the first lens system and the second lens unit comprises a diffractive optical element,
wherein the following conditions are satisfied:

DaW>DaT and $$10<|fDOE|/ft<500,$$

where DaW and DaT represent the spaces between the first lens system and the second lens unit at a wide-angle end and at a telephoto end, respectively;
fDOE represents the focal length only due to diffraction of the diffractive optical element; and
ft represents the focal length of the entire system at the telephoto end, and
wherein the first lens system comprises two lens units, each having a negative optical power, at least one of the two lens units being moved so as to change the space between the two units during zooming.

16. A zoom lens comprising:
a first lens unit having a negative optical power;
a second lens unit having a negative optical power; and
a third lens unit having a positive optical power, from an object side in that order,
wherein during zooming, the spaces between the first lens unit and the second lens unit and between the second lens unit and the third lens unit are changed, and
wherein at least one of the first lens unit, the second lens unit, and the third lens unit comprises a diffractive optical element.

17. A zoom lens according to claim 16, wherein the following condition is satisfied:

$$10<|fDOE|/ft<500,$$

where fDOE represents a focal length only due to diffraction of the diffractive optical element; and
ft represents a focal length of the entire system at a telephoto end.

18. A zoom lens according to claim 16, wherein the first lens unit comprises the diffractive optical element and the optical power only due to diffraction of the diffractive optical element included in the first lens unit is negative.

19. A zoom lens according to claim 16, wherein the third lens unit comprises the diffractive optical element and an optical power only due to diffraction of the diffractive optical element included in the third lens unit is positive.

20. A zoom lens according to claim 16, wherein the third lens unit comprises an aperture diaphragm.

21. A zoom lens according to claim 16, wherein the following conditions are satisfied:

$$0.85<|fa|/\sqrt{(fw \cdot ft)}<1.1$$

and $$0.8<fb/\sqrt{(fw \cdot ft)}<1.2$$

where fW and ft represent focal lengths of the entire system at a wide-angle end and at a telephoto end, respectively;
fa represents a combined focal length of the first lens unit and the second lens unit at the wide-angle end; and
fb represents a focal length of the third lens unit.

22. A zoom lens according to claim 16, wherein the following condition is satisfied:

$$1.4<SKw/fw<2.0,$$

where SKw represents a back focus of the entire system at a wide-angle end; and fw represents a focal length of the entire system at the wide-angle end.

23. A zoom lens according to claim 16, wherein the following condition is satisfied:

$$-25° < \theta < 25°,$$

where θ represents an angle between a ray incident on a diffraction surface of the diffractive optical element and a normal of the diffraction surface, or it represents an angle between a ray emitted from a diffraction surface of the diffractive optical element and a normal of the diffraction surface.

24. A zoom lens according to claim 16, wherein a diffractive portion of the diffractive optical element is provided with a plurality of layers of diffraction gratings.

25. An optical instrument comprising:
an optical element and
a zoom lens according to claim 16 connected to said optical element.

26. An image pick-up apparatus comprising:
a zoom lens according to claim 16; and
a photoelectric conversion element for receiving an image formed by the zoom lens.

27. A zoom lens comprising:
a first lens system having an overall negative power and comprising at least two negative lens elements and at least one positive lens element; and
a second lens unit, disposed behind the first lens system, having a positive power and comprising at least two positive lens elements and at least one negative lens element,
wherein during zooming, at least the second lens unit is moved so that the space between the first lens system and the second lens unit is changed, and at least one of the first lens system and the second lens unit comprises a diffractive optical element,
wherein the following conditions are satisfied:

$$DaW > DaT$$

and $$10 < |fDOE|/ft < 500,$$

where DaW and DaT represent the spaces between the first lens system and the second lens unit at a wide-angle end and at a telephoto end, respectively;
fDOE represents the focal length only due to diffraction of the diffractive optical element; and
ft represents the focal length of the entire system at the telephoto end, and
wherein the first lens system comprises a lens unit that is stationary during zooming.

28. A zoom lens comprising:
a first lens system having an overall negative power and comprising at least two negative lens elements and at least one positive lens element; and
a second lens unit, disposed behind the first lens system, having a positive power and comprising at least two positive lens elements and at least one negative lens element,
wherein during zooming, at least the second lens unit is moved so that the space between the first lens system and the second lens unit is changed, and at least one of the first lens system and the second lens unit comprises a diffractive optical element,
wherein the following conditions are satisfied:

$$DaW > DaT$$

and $$10 < |fDOE|/ft < 500,$$

where DaW and DaT represent the spaces between the first lens system and the second lens unit at a wide-angle end and at a telephoto end, respectively;
fDOE represents the focal length only due to diffraction of the diffractive optical element; and
ft represents the focal length of the entire system at the telephoto end, and
wherein the first lens system comprises two negative lens units.

29. A zoom lens according to claim 28, wherein one of the two negative lens units is stationary during zooming, and the other of the two negative lens units moves during zooming.

30. A zoom lens comprising:
a first lens system having an overall negative power and comprising at least two negative lens elements and at least one positive lens element; and
a second lens unit, disposed behind the first lens system, having a positive power and comprising at least two positive lens elements and at least one negative lens element,
wherein during zooming, at least the second lens unit is moved so that the space between the first lens system and the second lens unit is changed, and at least one of the first lens system and the second lens unit comprises a diffractive optical element,
wherein the following conditions are satisfied:

$$DaW > DaT$$

and $$10 < |fDOE|/ft < 500,$$

where DaW and DaT represent the spaces between the first lens system and the second lens unit at a wide-angle end and at a telephoto end, respectively;
fDOE represents the focal length only due to diffraction of the diffractive optical element; and
ft represents the focal length of the entire system at the telephoto end, and
wherein the first lens system consists of a negative lens unit, and the negative lens unit and the second lens unit are the only lens units of said zoom lens.

31. A zoom lens comprising:
a first lens system having an overall negative power and comprising at least two negative lens elements and at least one positive lens element; and
a second lens unit, disposed behind the first lens system, having a positive power and comprising at least two positive lens elements and at least one negative lens element, wherein during zooming, at least the second lens unit is moved so that the space between the first lens system and the second lens unit is changed, and at least one of the first lens system and the second lens unit comprises a diffractive optical element,
wherein the following conditions are satisfied:

$DaW > DaT$ and $10 < |fDOE|/ft < 500,$ where DaW and DaT represent the spaces between the first lens system and the second lens unit at a wide-angle end and at a telephoto end, respectively;
fDOE represents the focal length only due to diffraction of the diffractive optical element; and
ft represents the focal length of the entire system at the telephoto end, and
wherein the first lens system comprises two lens units, the more image side one of which moves to perform focusing.

* * * * *

UNITED STATES PATENT AND TRADEMARK OFFICE
CERTIFICATE OF CORRECTION

PATENT NO. : 6,671,104 B2  
DATED : December 30, 2003  
INVENTOR(S) : Hiroshi Endo Page 1 of 1

It is certified that error appears in the above-identified patent and that said Letters Patent is hereby corrected as shown below:

Column 3,  
Line 21, "second to" should read -- second --.

Column 5,  
Line 41, "$C3 \times h^6 +$" should read -- $C3 \times h^6 + ...$ --.

Column 10,  
Line 46, "Ip" should be deleted.

Column 11,  
Line 23, "f 20.6" should read -- f = 20.6 --.

Column 14,  
Line 8, "sKw" should read -- SKw --.

Column 15,  
Line 12, "where fW" should read -- where fw --.

Column 16,  
Line 55, "where fW" should read -- where fw --.

Column 17,  
Line 18, "element and" should read -- element; and --.  
Line 19, "claim 16" should read -- claim 16, --.

Signed and Sealed this

Twenty-fifth Day of May, 2004

JON W. DUDAS  
*Acting Director of the United States Patent and Trademark Office*